July 28, 1936.  A. WALLACE  2,049,401

RAILWAY MAINTENANCE EQUIPMENT

Filed Nov. 19, 1932  2 Sheets-Sheet 1

INVENTOR
Allen Wallace
BY
ATTORNEY

July 28, 1936.  A. WALLACE  2,049,401
RAILWAY MAINTENANCE EQUIPMENT
Filed Nov. 19, 1932   2 Sheets-Sheet 2
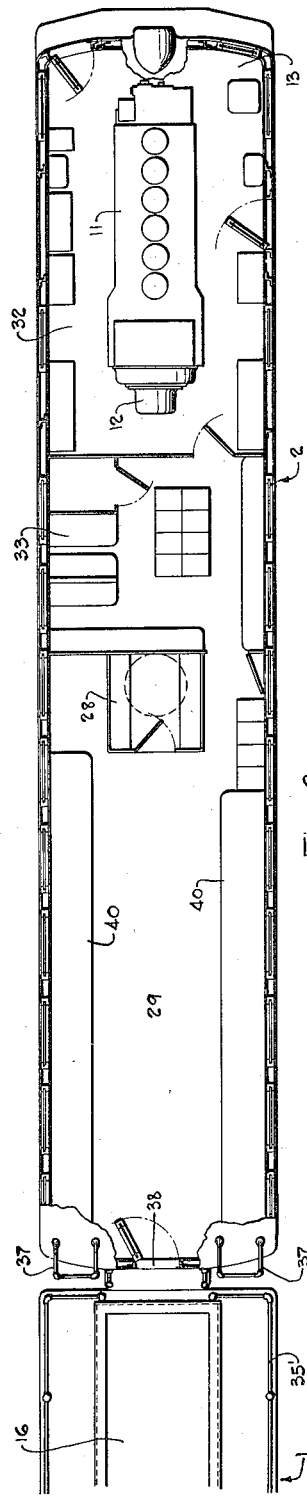
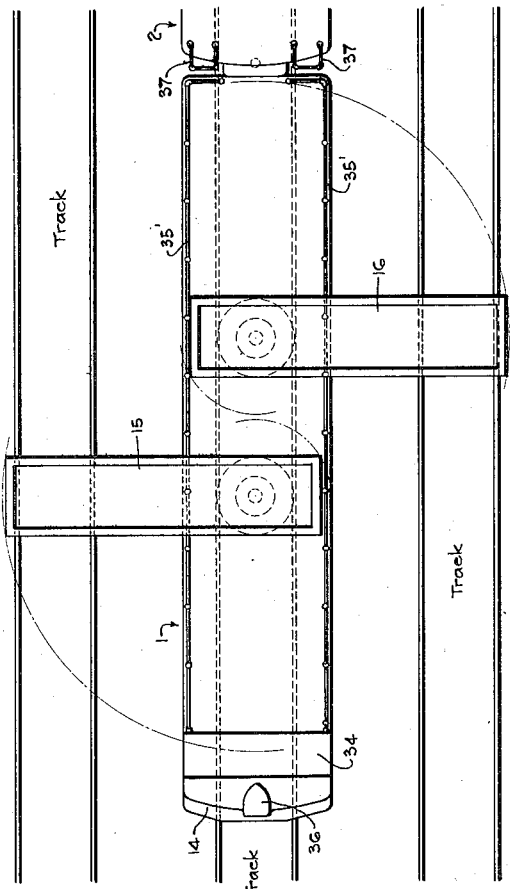
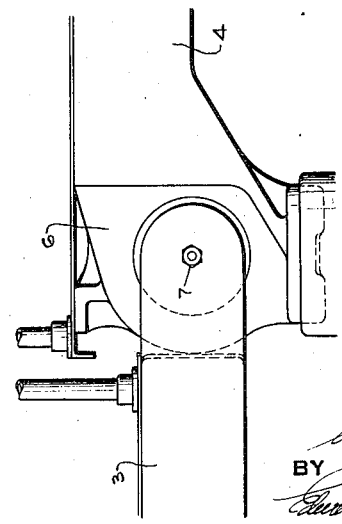
INVENTOR
BY
ATTORNEY Patented July 28, 1936

2,049,401

UNITED STATES PATENT OFFICE 2,049,401

RAILWAY MAINTENANCE EQUIPMENT

Allen Wallace, Moorestown, N. J.

Application November 19, 1932, Serial No. 643,405

9 Claims. (Cl. 105—238)

This invention relates generally to railroad maintenance equipment and more particularly to a work car for electrified railroads.

Electrification of railroads involves maintenance problems, especially in connection with maintenance of the trolley wires and guy wires therefor, that have not heretofore been adequately taken care of. The maintenance equipment for the overhead wiring system of electrified railroads must be adapted for maximum efficiency during travelling or repair work due to the necessity of such equipment being used in cases of emergency as well as during normal inspections, supervision and routine work. In any case, however, either when serving an emergency or otherwise, it is vital that the equipment should be able to travel fast both forwardly and backwardly and also that the foreman or supervisor may be so accommodated that not only the workmen may be easily kept under constant observation but that a testing pantograph may be accurately observed together with such a relation between the accommodations for the foreman and the tower platforms which form a part of any work car that such towers and pantograph may be efficiently controlled by the foreman from the position in which he is preferably accommodated. It is further necessary that the car shall have maximum speed in order to reach its destination in case of an emergency and yet have the usual tower platforms and other apparatus so arranged that a relatively low center of gravity is obtained together with maximum clearance for the towers, it being desirable to have the further feature of insuring maximum safety to the workman in walking around the cars or getting on to or off of the tower platforms.

One object of my invention is to accomplish the foregoing and other functions and advantages in an improved combination of elements in a work car. In accomplishing this object I provide a car having articulated under-frames, preferably in only two sections insofar as the particular combination herein set forth is concerned, and then in order to obtain maximum tractive effort and speed together with low center of gravity and sufficient clearance for the tower platforms, I cause the two articulated under-frames of the respective sections to be vertically offset and then place a tractor truck having larger diameter high speed wheels beneath the front end of the higher under-frame, which herein forms what might be called the propelling section, while the tower platforms of preferably hydraulic type are supported on the section having the lower under-frame which section will hereinafter be referred to as the tower section. By having the tower section formed on the under-frame of lower elevation, and by having a great center pin distance for the tower section, which is possible due to the articulated sections with only three trucks, I am able to obtain the desired low center of gravity with maximum spacing of the tower platforms, free from any interference from the trucks or other car mechanism such as would be the case if two separate cars were employed with a pair of relatively closely spaced trucks to each car. It will be seen from the foregoing and hereinafter description that the various elements above mentioned cooperate in such a manner as to be able to accomplish many desired results so as to form a unitary combined propelling and tower car.

Another object of my invention is to provide in the foregoing combination an improved relation between a test pantograph, tower platforms and cupola whereby a foreman or supervisor may observe the pantograph as it travels along the trolley and also supervise the workman on the platforms and at the same time centrally control the operation of the platforms and pantograph. Another object is to provide an improved combination of work and engine rooms and travelling quarters in combination with the tower platforms and cupola.

Other objects and advantages will be more apparent to those skilled in the art from the following description of the accompanying drawings in which:

Fig. 3 is an enlarged sectional plan view of the propelling unit of the Fig. 1 form;

Fig. 4 is an enlarged side elevation of the articulated joint by which the different levels of under-frames for the car sections are obtained; and Fig. 5 is a diagrammatic plan view of the tower car section showing how the tower platforms may be slewed to span track ways and trolleys on each side of the track on which the work car is travelling.

Figure 1:
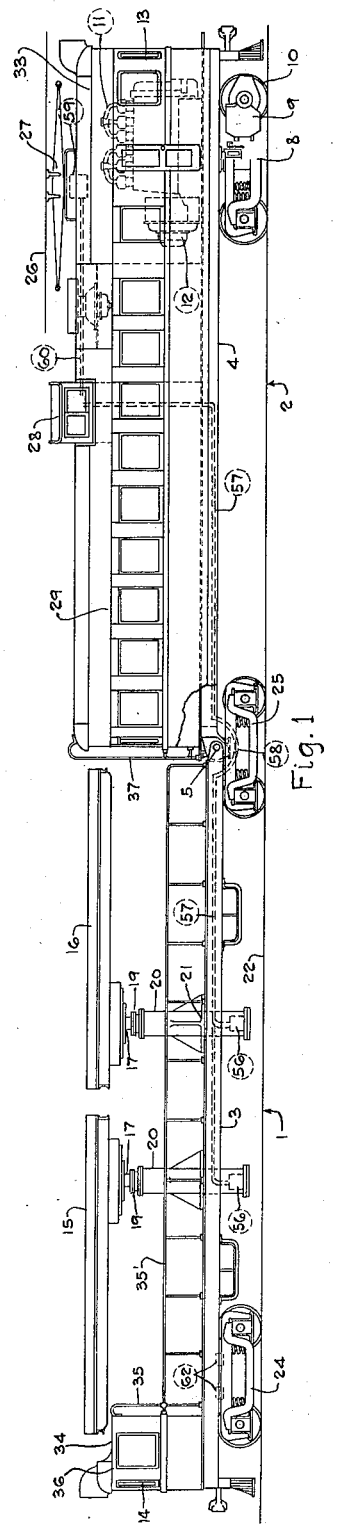
Fig. 1 is a side elevation of one form which the invention may take.

In the illustrated embodiment of the invention shown in Fig. 1 there is provided a tower section generally indicated at 1 and a propelling or power section generally indicated at 2, these sections forming a unitary work car. Each section is provided with under-frames 3 and 4 respectively of any suitable and usual car construction except that the sections at their adjacent ends are commonly connected to a suitable articulated joint generally indicated at 5, one specific form of which is shown in my Patent No. 1,888,190, issued November 15, 1932 and Patent No. 2,013,546, issued September 3, 1935, insofar as the specific joint elements are concerned. However, in order to create my improved work car I have caused the under-frame 4 to be disposed, as is more clearly shown in Fig. 4, at a higher elevation than under-frame 3, this being accomplished by having the element 6 of the joint extend upwardly from the horizontal axis 7 of the joint. With the under-frame 4 disposed at a higher elevation I am able to place beneath the front end of section 2 a tractor truck generally indicated at 8 which as shown in Fig. 1 is broken away to show a motor generally indicated at 9 for driving the relatively large diameter high speed driving wheels 10. The electric power for motor 9 may be derived from the trolley wire if so desired but in a work car it is necessary or desirable to have an independent source of current and to obtain such a source and at the same time properly distribute the weight of the equipment so as to obtain maximum traction I have located, preferably directly over the tractor truck, an internal combustion engine generally indicated at 11 preferably of the oil type which drives a generator 12. As the specific details of this mechanism do not form a part of my invention, it will suffice to say that the engine, generator and motor controls will be located within control cabs 13 and 14 located respectively at the ends of the car so that the car may travel in either direction under full control of the operator.

Due to the relatively high speed at which it is desired to operate an efficient work car with the consequent desire to maintain a low center of gravity together with the necessary clearance between the tower platforms and trolley especially during repair work in a tunnel, I utilize the section 1 having the lower level under-frame 3 for supporting tower platforms 15 and 16. These platforms are supported near their adjacent ends upon suitable hydraulically actuated plungers 17 which operate within telescoping cylinders 19 and 20. Inasmuch as these hydraulically actuated extensible pistons and cylinders are the same for each platform, it will suffice to describe only one, it being noted that in each case however the cylinder 20 is suitably supported by a flanged base 21 upon the upper surface of under-frame 3 and projects downwardly beneath the same to a point of safe clearance from the track level 22. As is seen in Fig. 5 the hydraulic cylinders are disposed on the longitudinal center line of section 1 and also are spaced longitudinally without the least suggestion of any interference with the smaller diameter wheeled end truck 24 or center truck 25 which carries the articulated joint 5. Also as a result of this arrangement the platforms 15 and 16 have ample clearance not only with the trolley wire 26 during normal work by the workman but also will permit safe travelling through a tunnel or work on the trolley wires therein.

To insure proper cooperation between the platforms 15 and 16 and a testing pantograph 27, mounted upon the front end of power section 2, I have provided a cupola 28 projecting above the top of the power car body. The cupola is provided with suitable windows in the front and back and above the top of the car roof, thus permitting a foreman or supervisor to easily observe the action of the testing pantograph 27 with reference to trolley wire 26 and also due to the interposition of the coupola between pantograph 27 and the platforms the supervisor can keep a close check on the necessary repairs or adjustments to the wire as successive misaligned portions of the wire pass first over the pantograph and then back to the workman as the car travels along slowly, thus providing an efficient sequence of testing and repairing operations with proper supervision thereof.

The cupola 28 preferably has communication as shown in Fig. 3 with a suitable workroom or compartment 29 thus further enlarging the supervisory range of the foreman when located in the cupola as he may directly observe as through a suitable doorway the workman or any repair work within the workroom 29. Interposed between the workroom 29 and engine compartment 32 is the crew compartment 33 provided with any usual equipment necessary for feeding or otherwise taking care of the crew.

The engine compartment 32 and front operator's cab 13 are combined into a single space at the front end of the power section whereas the operator's cab 14 at the end of the tower section is adapted to accommodate only the operator and operating controls.

To insure a large measure of safety and convenience to the workmen in walking around the cars or climbing on to or off of the tower platforms, I have cause the free end of platform 15 when in longitudinal alignment with the car to overlie a roof 34 of control cab 14 while a ladder or ladders 35 disposed at either or both sides of the control cab will permit a workman to climb up on to roof 34 and thence easily step with safety on to platform 15 and vice versa when getting off of the same. The top 34 is shown as being recessed downwardly from the head light and dome construction 36 although it will of course be understood that various shapes of tops may be employed. The workman may ascend to or descend from platform 16 by climbing either one of ladders 37 disposed at each side of the adjacent end of propelling section 2. As seen in Fig. 1 the ladder 37 is conveniently disposed and, due to this frame having the lower elevation, sufficient head room is provided between the under-frame and towers 15 and 16 so that a workman can with comfort walk from the ladders 37 and thence beneath the platform 16 to a doorway 38 opening into the work compartment 29 where benches 40 are available together with any usual tools that may be kept in a workroom of this character. Side rails 35' and suitable stanchions extend along each side of tower section 1 so as to completely enclose the same and safeguard the workman.

In the Fig. 1 form of my invention the weight is distributed on each pair of wheels of the respective trucks 24, 25 and 8 in the approximate relative proportions of 28,000, 43,000 and 51,000 lbs., respectively.

As shown in Fig. 5 the towers 15 and 16 may each be slewed 180° so as to span the trackway and permit a workman to reach a wire on either side of the track on which the work car is disposed and in addition the tower platforms 15 and 16 are normally disposed during their working position so as to permit a steam locomotive to pass on the track over which either of the platforms may be disposed when in a position such as shown in Fig. 5, thus greatly enhancing the efficiency of the work car not only because of the time saved in swinging the platforms as might otherwise be necessary to permit the steam train to pass but also on account of the time saved in avoiding any slowing down of the steam train.

Figure 2:
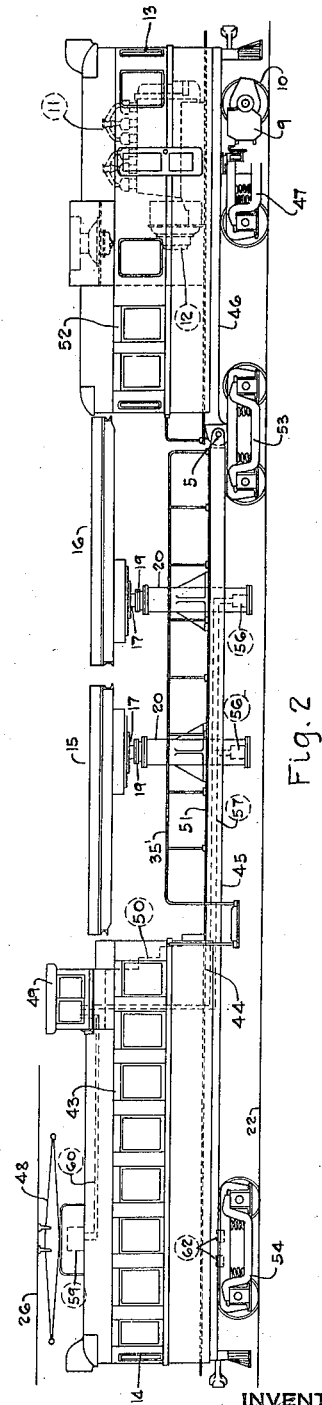
Fig. 2 is a side elevation of another form of the invention.

In the modification shown in Fig. 2 a work compartment 43 is carried on a tower section 44 having a lower level under-frame 45 articulately connected to a foreshortened propelling section 46 which has in the preferred form a higher level under-frame to permit the use of a high speed large diameter wheel tractor truck 47. A test pantograph 48 in this modification is carried on the workroom compartment while a cupola 49 has the same relative position with respect to the workmen's compartment as in the preferred form except that it is preferable in this modification to provide steps 50 leading up to the cupola from the tower platform floor 51. A crew's quarters 52 are, however, carried on the propelling section 46 and the roofs of compartments 43 and 52 provide necessary means of access to the tower platforms. In this modification as in the preferred form ample room is provided for the location and spacing of the extensible hydraulic cylinders 20 without interference from the center truck 53 or end truck 54.

In each form of the equipment herein shown it is desired that the raising and lowering or even the rotation of the platforms may be controlled from the cupola as well as control of the testing pantograph. To do this a valve mechanism 56 is diagrammatically illustrated alongside of each cylinder while suitable connections either in the form of electric wires or fluid supply pipes 57 extend over to the cupola and have a simple loose portion 58 passing over or around the articulated joint while a suitable pantograph control generally indicated at 59 has suitable control wires 60 leading to the cupola. It will of course be understood that the specific details of these controls are not part of my invention except insofar as they are incorporated into my improved combination of elements.

From the foregoing description of the two modifications among possible others it is readily seen that a relatively simple, inexpensive and yet efficient work car has been provided, and it is also seen that my improved relation of the higher and lower levels of under-frames permits the accommodation of a suitable tractor truck with larger diameter wheels and allows the platform or floor of the tower section to be lower than that of the propelling section, thus overcoming the obstacle of restricted overhead clearance and at the same time permitting ample head room clearance for the workmen in walking around the floor of the tower section while at the same time the hydraulic telescoping cylinders by projecting through and beneath the tower section platform and under-frame will permit a desired degree of low center of gravity without endangering clearance with the trackway but in order to facilitate the stability of the tower sections it is preferable that the side bearings diagrammatically indicated at 62 of trucks 24 and 54 should have little or no clearance, thus preventing sidewise rocking of the tower section which might endanger workmen on the tower platforms. Inasmuch as the side bearings 62 are a well-known element in the art the same are not described or shown in detail except to state that herein these side bearings are adjusted to a minimum clearance so that from a practical standpoint it might be said that they have no clearance. It is observed in my improved combination that the three truck design especially for a work car such as shown herein gives a greater center pin distance than would be possible if two ordinary cars of the same platform area were used and in addition I have obtained a distribution of equipment on the under-frames which insures greater weight on the tractor trucks than on the other trucks. As a result I not only obtain a more compact arrangement but one which will have a large degree of safety while travelling at a high speed in either direction even though the tower section may be pushed instead of pulled during travelling.

I claim:

1. A work car comprising, in combination, articulated sections one of which has a car body and the other of which has a work tower, the outer ends of said sections each having its own truck and the adjacent ends of said sections having a common truck, a pantograph carried by one of said sections, and a cupola projecting above the roof of said car body to permit a person located within the cupola to have a substantially horizontal line of vision over the top of said tower and slightly below the top of said pantograph when in its operative working relation to a trolley wire.

2. A work car comprising, in combination, a propelling section articulated with another section which is provided with a tower, the outer ends of said sections each having its own truck and the adjacent ends of said sections having a common truck, one of said sections having a pantograph and a cupola disposed substantially at the elevation of said pantograph and tower within their operative working relation to a trolley wire, whereby a person within the cupola is adapted to have a substantially horizontal line of vision of said pantograph and said tower.

3. A work car comprising, in combination, articulated propelling and tower sections, the outer ends of said sections each having its own truck and the adjacent ends of said sections having a common truck, one of said sections carrying a car body and the other section a tower, a pantograph carried on the roof of said body and a cupola projecting above said roof to permit substantially direct horizontal observation of said pantograph and tower when in their operative working relation to a trolley wire.

4. A work car comprising, in combination, articulated propelling and tower sections each having under-frames, said tower section having a plurality of vertically adjustable hydraulic pistons and cylinders spaced apart longitudinally of the car, means for supporting said cylinders on the under-frames of said tower section so as to project above and below the same, and platforms carried by said hydraulic pistons and cylinders and having a substantial portion offset from the axes thereof, said offset portions extending in a direction away from said cylinders so that the shorter portions of the platforms are adapted to be disposed adjacent each other between the axes of said cylinders.

5. A work car comprising, in combination, articulated propelling and tower sections, one of said sections having a work compartment, screw compartment and engine compartment, and the other section having a plurality of hydraulically actuated vertically adjustable and laterally swingable towers relatively closely spaced, and tower platforms having substantial offset portions whereby when adjacent platforms are in longitudinal alignment with the car the shorter portions of the platforms are disposed adjacent each other between the axes about which the towers swing.

6. A work car comprising, in combination, articulated propelling and tower sections, one of said sections having a work compartment, screw compartment and engine compartment, and the other section having a plurality of hydraulically actuated vertically adjustable and laterally swingable towers relatively closely spaced, tower platforms having substantial offset portions whereby when adjacent platforms are in longitudinal alignment with the car the shorter portions of the platforms are disposed adjacent each other between the axes about which the towers swing, and control compartments at the ends of the respective sections.

7. A work car comprising, in combination, articulated propelling and tower sections, one of said sections having a work compartment, crew compartment and engine compartment, and the other section having a plurality of hydraulically actuated vertically adjustable and laterally swingable towers relatively closely spaced, tower platforms having substantial offset portions whereby when adjacent platforms are in longitudinal alignment with the car the shorter portions of the platforms are disposed adjacent each other between the axes about which the towers swing, and a ladder carried by the end of the body of said compartments adjacent the tower section whereby when a tower platform is in longitudinal alignment with the car a workman can step from said platform to said ladder.

8. A work car comprising, in combination, articulated propelling and tower sections, one of said sections having a work compartment, crew compartment and engine compartment, and the other section having a plurality of hydraulically actuated vertically adjustable and laterally swingable towers relatively closely spaced, tower platforms having substantial offset portions whereby when adjacent platforms are in longitudinal alignment with the car the shorter portions of the platforms are disposed adjacent each other between the axes about which the towers swing, a cupola projecting above the roof of said compartments, a pantograph carried by said roof, and controls for said towers and pantograph centrally located in said cupola whereby a man therein may observe and control said pantograph and towers.

9. The combination set forth in claim 8 further characterized in that said propelling and tower sections have under-frames, the under-frame for the propelling section being offset from and disposed at a higher elevation than the under-frame for the tower section, a center truck located at the adjacent articulated ends of said sections with the truck wheels of such diameter that it may extend beneath the tower section which has the under-frame of lower elevation, an end truck also disposed beneath the under-frame of said tower section, and a tractor truck having wheels of larger diameter than said other trucks and disposed beneath the end of the under-frame of the propelling section.

ALLEN WALLACE.